G. W. COOPER.
Cotton-Planter.

No. 10,595.  Patented Mar. 7, 1854.

UNITED STATES PATENT OFFICE.

GEO. W. COOPER, OF PALMYRA, GEORGIA.

IMPROVEMENT IN COTTON-SEED PLANTERS.

Specification forming part of Letters Patent No. 10,595, dated March 7, 1854.

*To all whom it may concern:*

Be it known that I, G. W. COOPER, of Palmyra, in the county of Lee and State of Georgia, have invented a new and Improved Implement for Planting Cotton-Seed; and I do hereby declare that the following is a full, clear, and exact description of the construction and operation of the same, reference being had to the accompanying drawings, making a part of this specification, in which—

Figure 1:
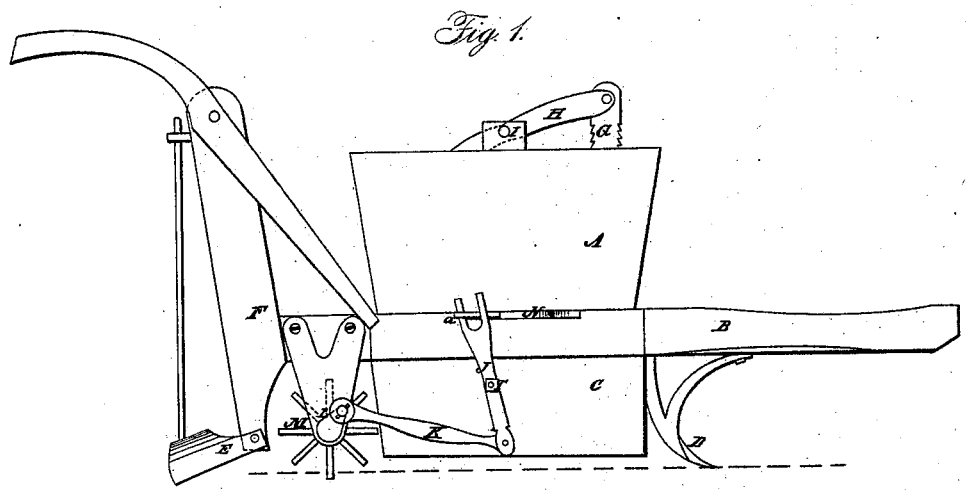
Figure 2:
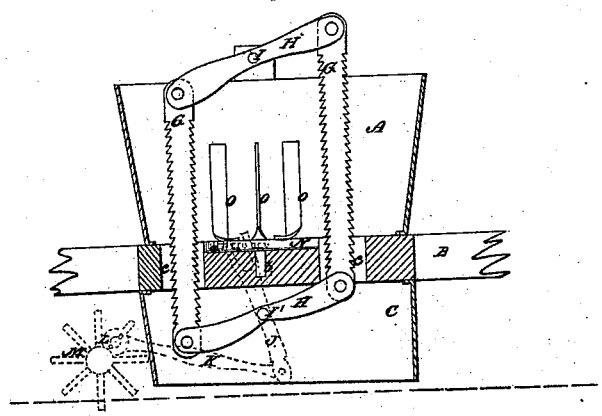

Figure 1 is a side elevation of my improved cotton-seed planter. Fig. 2 is a vertical section of the hopper, showing the reciprocating saws and feeders for the purpose of discharging the seed from the hopper.

Similar letters of reference in each of the two figures indicate corresponding parts.

The nature of my invention consists in a peculiar manner of distributing the seed or of discharging or forcing them from the hopper. This is effected by vertical saws (one or more being used) having a reciprocating motion and working through slots or openings in the bottom of the hopper, and using, in connection with the saws, "feeders," which are placed vertically on a circular disk at the bottom of the hopper, the said disk having a reciprocating rotary motion.

To enable others skilled in the art to fully understand and construct my invention, I will proceed to describe its construction and operation.

A represents a hopper placed upon a draft-beam, B, and C is a guide chamber or spout underneath the beam B and in line with the hopper A.

D is a furrow-share attached to the under side of the beam A, directly in front of the chamber or spout C, as shown in Fig. 1.

E is a covering-share attached to the lower end of the upright F at the back end of the beam B, as shown in Fig. 1.

G G are two vertical saws, the upper and lower ends of which are attached to levers H H on rock-shafts I I', as shown in Fig. 2.

The rock-shaft I' is attached at one end to a lever, J, at about its center. The lower end of the lever J is secured by a pivot to one end of a connecting-rod, K, the opposite end of which is attached to a crank, L, on the axis of a spur-roller, M, as seen in Fig. 1 and dotted lines in Fig. 2. The upper end of the lever J is forked, and a projection, *a*, attached to a circular disk, N, passes between the prongs of the fork.

The circular disk N rests upon the upper surface of the beam B and at the bottom of the hopper A, a pivot, *b*, passing through the center of the disk and into the beam, as shown in Fig. 2.

Upon the upper surface of the disk N are placed vertical strips O, which I term "feeders," any proper number being used.

The vertical saws G G, it will be seen by referring to Fig. 2, pass or work through slots or openings *c c* in the beam B.

Operation: When the implement is drawn along the spur-roller M is turned, on account of its spurs penetrating the earth, and an oscillating movement is communicated to the lever J by means of the connecting-rod K and crank L; and, as the projection *a* of the disk N fits between the prongs at the upper end of the lever J, a reciprocating rotary motion is given to the feeders O on the disk N. The saws G G also have an alternate reciprocating motion given them on account of the lever J being attached to the shaft I', as shown. The saws, as they work up and down, draw the cotton-seed from the hopper A through the slots or openings *c c*, and they fall into the furrow made by the share D, the guide chamber or spout C preventing the seeds from being scattered or falling beyond the edges of the furrow. The feeders O, as they operate, press or feed the seeds toward the saws and prevent the binding and lodgment of the seeds within the hopper.

Cotton-seeds, being of an irregular form, will not pass readily or surely from a hopper without some mechanical device for drawing or forcing them out. By my improvement the seeds will be drawn with certainty from the hopper, and will be evenly distributed in the furrows. The lint which adheres to the cotton-seeds also prevents them from passing readily from the hopper without some device for effecting the purpose.

Having thus described my invention, what I claim as new, and desire to secure by Letters Patent, is—

The combination of the saws G G and feeders O, the said saws having a reciprocating rectilinear motion, and the said feeders having a reciprocating rotary motion, the above parts being constructed and arranged substantially as herein set forth.

GEORGE W. COOPER.

Witnesses:
JAMES M. McDANIELS,
J. H. WATSON.